US010354467B2

(12) United States Patent
Baker et al.

(10) Patent No.: US 10,354,467 B2
(45) Date of Patent: Jul. 16, 2019

(54) REMOTE MONITORING AND CONTROL SYSTEM FOR A BARRIER OPERATOR

(71) Applicant: AUTOMATIC TECHNOLOGY (AUSTRALIA) PTY LTD, Keysborough (AU)

(72) Inventors: Geoff Baker, Keysborough (AU); Ray Hawkins, Keysborough (AU); Simon Kelly, Keysborough (AU)

(73) Assignee: Automatic Technology (Australia) Pty Ltd, Keysborough (AU)

( * ) Notice: Subject to any disclaimer, the term of this patent is extended or adjusted under 35 U.S.C. 154(b) by 0 days.

(21) Appl. No.: 15/518,955

(22) PCT Filed: Oct. 13, 2015

(86) PCT No.: PCT/AU2015/050625
§ 371 (c)(1),
(2) Date: Apr. 13, 2017

(87) PCT Pub. No.: WO2016/058044
PCT Pub. Date: Apr. 21, 2016

(65) Prior Publication Data
US 2017/0236354 A1 Aug. 17, 2017

(30) Foreign Application Priority Data
Oct. 13, 2014 (AU) ................. 2014904091

(51) Int. Cl.
*G07C 9/00* (2006.01)
*H04L 9/32* (2006.01)
(Continued)

(52) U.S. Cl.
CPC ..... *G07C 9/00896* (2013.01); *G07C 9/00007* (2013.01); *G07C 9/00309* (2013.01);
(Continued)

(58) Field of Classification Search
CPC ......... B60R 25/04; B60R 25/24; G07C 5/008; G07C 9/00103; G07C 9/00174;
(Continued)

(56) References Cited

U.S. PATENT DOCUMENTS 6,166,634 A 12/2000 Dean
8,768,565 B2* 7/2014 Jefferies ................. G07B 15/00
701/29.6

(Continued)

OTHER PUBLICATIONS

PCT Notification of Transmittal of The International Search Report and The Written Opinion of The International Searching Authority, or The Declaration dated Nov. 4, 2015 for PCT Application No. PCT/AU2015/050625.

(Continued)

Primary Examiner — Carlos Garcia
(74) Attorney, Agent, or Firm — Barnes & Thornburg LLP; Jeffrey Stone

(57) ABSTRACT

The invention generally relates to a gateway device (102) that operates as a hub or base station to provide for remote monitoring and control of a barrier operator (104,106) such as is used to operate a powered garage door. The device (102) includes a processor; a data storage device; a network interface for connecting the gateway device to a computer network (114); an operator interface for communicating with the barrier operator; and a computer program, which when executed on the processor: permits access to the gateway device over the computer network by way of a mobile application installed on a mobile device (108); transmits control signals received over the computer network to the barrier operator (104,106); and receives monitoring signals from the barrier operator (104,106).

20 Claims, 5 Drawing Sheets

(51) Int. Cl.
  *H04W 4/60* (2018.01)
  *H04L 12/28* (2006.01)
  *H04L 12/66* (2006.01)
  *H04W 12/06* (2009.01)
  *H04W 12/08* (2009.01)
(52) U.S. Cl.
  CPC .............. *H04L 12/28* (2013.01); *H04L 12/66* (2013.01); *H04W 12/06* (2013.01); *H04W 12/08* (2013.01); *G07C 2009/00928* (2013.01); *H04L 9/32* (2013.01); *H04W 4/60* (2018.02)
(58) Field of Classification Search
  CPC ............ G07C 9/00182; G07C 9/00309; G07C 2009/00642
  USPC .......................................... 340/5.7, 5.71, 5.8
  See application file for complete search history.

(56) References Cited

U.S. PATENT DOCUMENTS

| | | | | |
|---|---|---|---|---|
| 9,373,201 | B2* | 6/2016 | Jefferies | G07B 15/00 |
| 9,478,084 | B1* | 10/2016 | Robinson | G07C 9/00111 |
| 9,721,406 | B2* | 8/2017 | Isaacson | G07C 9/00103 |
| 2003/0208386 | A1* | 11/2003 | Brondrup | G06Q 10/02 |
| | | | | 705/5 |
| 2006/0025132 | A1 | 2/2006 | Karaoguz et al. | |
| 2007/0247276 | A1 | 10/2007 | Murchison | |
| 2011/0311052 | A1* | 12/2011 | Myers | G07C 9/00103 |
| | | | | 380/270 |
| 2013/0151977 | A1 | 6/2013 | Arteaga-King et al. | |
| 2013/0237193 | A1* | 9/2013 | Dumas | G07C 9/00571 |
| | | | | 455/414.1 |
| 2014/0129606 | A1 | 5/2014 | Cate et al. | |
| 2015/0363986 | A1* | 12/2015 | Hoyos | G07C 9/00563 |
| | | | | 340/5.61 |
| 2015/0363989 | A1* | 12/2015 | Scalisi | G07C 9/00904 |
| | | | | 348/143 |
| 2016/0055699 | A1* | 2/2016 | Vincenti | G07C 9/00309 |
| | | | | 340/5.61 |
| 2017/0053467 | A1* | 2/2017 | Meganck | G07C 9/00039 |

OTHER PUBLICATIONS

PCT Written Opinion of The International Searching Authority, or The Declaration dated Nov. 4, 2015 for PCT Application No. PCT/AU2015/050625.
PCT Written Opinion of The International Searching Authority, or The Declaration dated Sep. 9, 2016 for PCT Application No. PCT/AU2015/050625.
PCT Written Opinion of The International Searching Authority, or The Declaration dated Dec. 13, 2016 for PCT Application No. PCT/AU2015/050625.
Supplementary European Search Report dated May 16, 2018, issued in related European Patent Application No. 15849877.4.

* cited by examiner

REMOTE MONITORING AND CONTROL SYSTEM FOR A BARRIER OPERATOR

FIELD OF THE INVENTION

The invention relates to a remote monitoring and control system for a barrier operator. More particularly, embodiments of the invention relate to a remote monitoring and control system for a garage door or gate operator, but the scope of the invention is not necessarily limited thereto.

BACKGROUND OF THE INVENTION

Conventionally, barrier operators are used to drive barriers such as garage doors and gates. The barrier operators can typically be controlled by a handheld radio transmitter device within a relatively short operating range of the barrier and/or a wall switch connected to the barrier operator.

In recent times, with the development of smart phones and PDAs (Personal Digital Assistants), various remote control systems for controlling barrier operators via the Internet have been developed. These remote control systems provides the user with the convenience of operating a barrier from any location (e.g. from the office, or whilst travelling on holiday).

However, many of the current remote control systems on the market have a number of shortcomings, including limited functionality, scalability or flexibility and/or poor security configurations in which the security of these systems may be relatively easily compromised, presenting significant risk to owners.

Embodiments of the invention provides a remote control and monitoring system for a barrier operator which addresses at least in part one or more of the disadvantages or problems described above, or which at least provides the consumer with a useful choice.

In this specification, where a document, act or item of knowledge is referred to or discussed, such a reference or discussion is not an admission that the document, act or item of knowledge or any combination thereof was at the priority date part of common general knowledge, or known to be relevant to an attempt to solve any problem with which this specification is concerned.

SUMMARY OF THE INVENTION

According to one aspect of the invention, there is provided a gateway device for remote monitoring and control of a barrier operator, the device including:
  a processor;
  a data storage device;
  a network interface for connecting the gateway device to a computer network;
  an operator interface for communicating with the barrier operator; and
  a computer program, which when executed on the processor:
    permits access to the gateway device over the computer network;
    transmits control signals received over the computer network to the barrier operator; and
    receives monitoring signals from the barrier operator.

Preferably, the computer program is configured to execute a security algorithm requiring one or more client devices to register with the gateway device prior to accessing the gateway device over the computer network. The requirement for pre-registration of client devices with the gateway device provides improved security beyond the usual requirement for accessing the gateway device by entering a username and password into an application installed on the client device. Such a system becomes compromised if an unauthorised third party was to obtain the username and password, that can then be simply entered into the application to access the gateway. Such unauthorised access would not be possible with the present invention, owing to the feature of client device registration.

Typically, the computer program is configured to accept separate registrations from individual client devices. The gateway device is configured to manage a unique list of registered devices that are created by the user of the gateway device.

Preferably, registration is effected by storage on the gateway device of a unique client device identifier. Optimally, the client device identifier is also stored on a remote Internet server in association with a unique gateway device identifier.

Typically, the computer program is configured to register client device/s by:
  creating a profile on the gateway device;
  prompting the entry of the profile into the client device;
  receiving the profile at the gateway device;
  authenticating the client device against the profile; and
  generating the unique client device identifier.

Alternatively, the computer program is configured to register client device/s by:
  creating a profile on the gateway device;
  prompting the entry of the profile into the client device;
  receiving the profile at the gateway device;
  generating unique client device credentials; and
  authorising the client device against the profile.

According to some embodiments, the profile includes a password. Preferably, the password is stored on the gateway device in hashed form. The password need not be stored on the client device.

The client device accesses the gateway device through an application that is installed on the client device, with access to the application being controlled through the profile.

Optionally, the security algorithm is configured to transmit authentication credentials to the client device during registration of the client device, the authentication credentials being stored on the gateway device and client device and being suitable for use by the client device to access the gateway device.

Typically, the authentication credentials are transmitted to the client device along with the unique client device identifier and the unique gateway device identifier.

Typically, the gateway device is configured to receive control signals from client devices having access to the gateway device over the computer network.

According to preferred embodiments, the gateway device authenticates control signals received from the client device/s before transmitting the control signals to the barrier operator.

According to preferred embodiments, the client device includes a time stamp with the control signal. This enables the gateway device to reject command signals that are received outside of an appropriate timeframe.

Preferably, the gateway device is coupled to a Wi-Fi network in order to facilitate access to the gateway device by client devices also connected to the Wi-Fi network. According to preferred embodiments, the gateway device is also in communication with an Internet server to facilitate access to the gateway device by client devices over the Internet. The Internet server is configurable to mirror the state of the barrier operator and registered client devices (or a subset thereof) that are stored on the gateway device.

Preferably, at least a subset of the authentication credentials are transmitted to the Internet server from the gateway device after the client device is registered with the gateway device.

Preferably, control signals received at the Internet server from a client device are transmitted to the gateway device for authentication prior to actioning by the barrier operator. This feature provides the advantage that in the event of the Internet server being compromised, command signals that are transmitted to the gateway device from the compromised server will not be actioned by the barrier operator.

Preferably, the computer program includes a module configured to receive and store data from the barrier operator pertaining to the barrier operator's operating characteristics. This combination of accessibility of the barrier operator's operating characteristics to the gateway device, and the ability to control and monitor the barrier operator from the gateway device, allows the gateway device to effectively function as a 'virtual barrier operator'. Advantageously, configuration actions that were previously only available at the barrier operator (such as setting part-open positions, code-setting new remote control transmitters, adjusting operating times and modes of operation) can be undertaken through the gateway device. Such configuration actions can be performed either directly through the gateway device (by a user in physical proximity to the gateway device, eg. by way of a user interface) or by remotely accessing the gateway device over the computer network from a client device.

The gateway device may be configured to retain information in relation to the specific set up parameters for the barrier operator, and identification information in relation to the mobile device. The gateway device may be configured to control one or more barrier operators, and other peripheral devices including lights, sensors, and/or cameras. In addition, the gateway device may be configured to register the mobile device before allowing the mobile device to transmit control signals for controlling the barrier operator. The gateway device may be configured to allow registration of one or more of mobile devices such that a control signal from any one of the mobile devices can be used to control the barrier operator The gateway device may be configured through a user interface that is displayed on the client device by way of the installed application. that is installed thereon. on the client device. The gateway device can be also be provided with an interface display for communication with a user to receive configuration commands.

Alternatively or additionally, the gateway device may include an interface display to allow a user to configure and/or control the barrier operator directly. In one embodiment, the gateway device includes a tablet device having a touch screen display for communication with a user.

The gateway device may include control circuitry for receiving, processing and transmitting information including control signals for controlling the barrier operator. Typically, the control circuitry of the gateway device communicates with the barrier operator wirelessly via radio communication. More specifically, the frequency of the radio communication may be 915 MHz.

In one embodiment, the gateway device may include a touch screen interface display, a Wi-Fi communications module, and a radio communications transceiver unit. The Wi-Fi communications module may be configured for connection with a local Wi-Fi router such that the gateway device functions as a HTTPS web server for secure communication with the mobile device when the mobile device is connected to the Wi-Fi network.

According to one embodiment, the operator interface provides for wireless communication with the barrier operator.

The operator interface may include a radio frequency transceiver unit arranged to operate on 915 MHz frequency. This frequency provides a suitable communication range of approximately 50 m for most home, office and industry applications. The transceiver unit may include memory for storing rolling code counters, one or more unique IDs of transceivers of one or more barrier operators registered with the gateway device, a unique ID of the gateway device, and one or more encryption keys.

The barrier operator may include a transceiver having a unique ID. The gateway device may capture the unique ID of the barrier operator transceiver to allow registration of the barrier operator with the gateway device during installation. The unique ID of the barrier operator transceiver may be a serial number which is manually entered into the gateway device. Alternatively, the unique ID may be a code (such as a QR code) that is automatically captured by a data capture device on the client device (such as a camera) or gateway device (such as a camera, infrared scanner, NFC scanner of the like).

When registering more than one barrier operator with the gateway device, the unique ID of a transceiver of each barrier operator will be captured by the gateway device.

The gateway device may be configured to receive confirmation of registration from each barrier operator. In one embodiment, each barrier operator may include a push button or other manually operable means which can be activated manually to realise or to confirm registration. Alternatively, the transceiver of each barrier operator may be configured to send a confirmation wirelessly to the transceiver of the gateway device. The confirmation may be in the form of a confirmation password.

As noted above, the gateway device may be configured to allow registration of one or more of mobile devices before the one or more mobile devices can be used to transmit control signals to the gateway device. A password may be required for registration of a mobile device with the gateway device. Further detail regarding the registration process is discussed below.

The gateway device may be configured to allow operating parameters of the barrier operator to be set via the interface display during setup, and changed eg. during service or repair operations. By way of example, some operating parameters may include open and close travel limit positions for the barrier, timers for peripheral devices such as lights, and part open positions (e.g. prescribed barrier position for pet entry, pedestrian entry, parcel delivery, or ventilation).

The gateway device may be configured to provide a service menu for service technicians of the barrier operator. The service menu may allow a technician to log in to a service account when performing a service on the barrier operator such that each service is electronically logged in the gateway device. In addition, the gateway device may be configured to generate reminders for upcoming scheduled service dates for the barrier operator.

The gateway device may also be configured to store an event log of all monitoring signals detailing control events executed by the barrier operator with the time and date of event execution. For example, a control event may be 'garage door closed by Bob at 10:45 am 3 Jul. 2014'. The event log can provide useful diagnostics information to a service technician during maintenance and/or repair. Moreover, the gateway device can be configured to send notifications to the mobile device so as to alert the user, for example, of the execution of an event, or a service reminder.

The gateway device is configurable to transmit push notifications to a client device in response to the detection of status events with respect to the barrier operator. For example, the gateway device can be configured to transmit a push notification to indicate that the garage door connected to the barrier operator has been open for a prescribed time period (eg. one minute), to provide a reminder to the user to issue a command to close the garage door.

The monitoring signals can include information that the barrier operator has received a command from a remote control transmitter other than the gateway device and what action was taken based on that command (for example a status update 'received a CLOSE command from remote control number 1234567 and now closing').

The gateway device can be configured to receive a command relayed from the barrier operator, said command being received from the remote control without the command causing any action at the barrier operator (other than the reception and resulting status update). For example a status update: 'received gateway device command 1 from remote control number 1234567 and door is (still) closed'. This allows the remote control transmitter to activate a gateway device function that is not associated with barrier operator which received it. For example a command to operate a light or other garage door which is not registered with the remote control transmitter.

Typically, the mobile device communicates with the gateway device via a mobile application installed on the mobile device. The mobile application may access an online web server when the mobile device is not within range of the local Wi-Fi network. The mobile application may also directly access the gateway device over the Internet when out of the range of the local Wi-Fi network. Alternatively, the mobile application may access the gateway device through the Wi-Fi network when in range.

The mobile application may generate a control interface based on settings of the gateway device. In particular, the mobile application may include a control function associated with each type of barrier operator, and the mobile application may generate the control interface based on the number and type of barrier operators registered with the gateway device, such that the control interface includes a control function for each barrier operator registered with the gateway device.

The mobile application may allow the mobile device to control barrier operators at various different locations through communication with one or more gateway devices. For example, the user of the mobile device may be associated with one or more properties (e.g. home, office, holiday house, etc.) each installed with a remote control system and the user may be able to use a single mobile device to communicate and control barrier operators in each property. The mobile application may require separate log in details for each gateway device (ie. each location).

Different mobile devices registered with a gateway device may be configured with different access privileges. For example, in an industrial facility with many barrier operators and mobile devices registered with a gateway device, not all mobile devices will have full access privileges to control all barrier operators. In other words, some mobile devices may only have access privileges to control some barrier operators. The access privileges may be configured via the gateway device.

Advantageously, the password of the mobile device user is not saved on the online web server. This provides improved security for the system in which the password cannot be obtained by an unauthorised third party via the online web server. In addition, even if the password were obtained in some other manner by an unauthorised third party, the unauthorised third party would not be able to use the password to log in to the online web server without the corresponding registered mobile device and access the gateway device to control the barrier operator.

The mobile application may provide video footage captured from a camera. The video footage may provide a view of a barrier associated with the barrier operator. The mobile application may provide the video footage via the gateway device or independently of the gateway device.

The mobile application may receive notifications from the gateway device relation to events of the barrier operator (e.g. 'garage door opened by Bob at 2 pm on 17 Jul. 2014'). The mobile application may have access to event history logs for the barrier operator.

The remote control system may include one or more radio communication transmitters for sending control signals directly to the barrier operator via radio communication. The barrier operator can therefore be controlled using either the gateway device or the transmitter(s) via radio communication, eg. in the event that the Wi-Fi network and/or the Internet is interrupted, compromised or out of operation.

In particular, the gateway device may be configured to communicate with the barrier operator using multiple channels. When the gateway device needs to send a control signal to the barrier operator, the transceiver of the gateway device may select a random channel for transmitting the control signal, and determine whether to transmit the control signal based on activity on the selected channel. The gateway device may select a different channel if the previously selected channel is blocked. The gateway device may transmit the control signal using a different channel if no acknowledgement is received from the barrier operator once the control signal is transmitted. Moreover, the gateway device may generate an error message if no acknowledgement is received from the barrier operator once one or more control signals are transmitted.

The transmitter may communicate with the barrier operator in the same manner.

In one embodiment, the gateway device may allow the setting of vacation mode operation, in which the barrier operator will not respond to any control signals, including those issued over the local Wi-Fi network or remote computer network. Typically, this is achieved by disabling the transceiver in the barrier operator until the user switches the system out of vacation mode.

According to other embodiments, the vacation mode is configurable so as to allow access modes to be selectively disabled. This allows access from particular mobile devices or transmitters to be disabled, while continuing to allow access from other devices. Preferably, the selective access vacation mode can be activated through the mobile application, but only deactivated after satisfying a higher security level.

The gateway device may communicate using rolling code and encryption via radio communication with the barrier operator. The gateway device may communicate with the online web server via the local Wi-Fi network. The mobile device may communicate with the gateway device via the local Wi-Fi network directly if the mobile device is within the range of the Wi-Fi network, or indirectly through the online web server if the mobile device is outside of the range of the Wi-Fi network. The remote control system may use HTTPS secure communication protocol. In particular, HTTPS connections may be used for communication between the mobile device and the gateway device, and between the gateway device and the online web server.

According to another aspect of the present invention, there is provided a remote monitoring and control system, comprising:
- a gateway device in accordance with the first aspect of the invention; and
- one or more barrier operators in communication with the gateway device.

Preferably, the system includes a server device communicatively coupled to the gateway device through the Internet, the server device being configured to allow client devices to securely access the gateway device.

According to another aspect of the present invention, there is provided a method for remotely monitoring and controlling one or more barrier operators, the method comprising the steps of:
- providing a gateway device in accordance with the first aspect of the invention; and
- accepting registration of the barrier operator with the gateway device.

Preferably, the method includes the step of transmitting a unique gateway device identifier to an Internet server. According to preferred embodiments, the transmitting step is performed prior to registration of any client devices or registration of a barrier operator. In a preferred embodiment, this is done before the gateway device is installed, eg. during factory setup or manufacture. This preset registration of each gateway device to the Internet server that will then be used to implement the invention provides an additional security measure.

BRIEF DESCRIPTION OF THE DRAWINGS

The invention will now be further explained and illustrated by reference to the accompanying drawings in which.

DETAILED DESCRIPTION OF THE DRAWINGS

Overview of the Remote Control System

Figure 1:
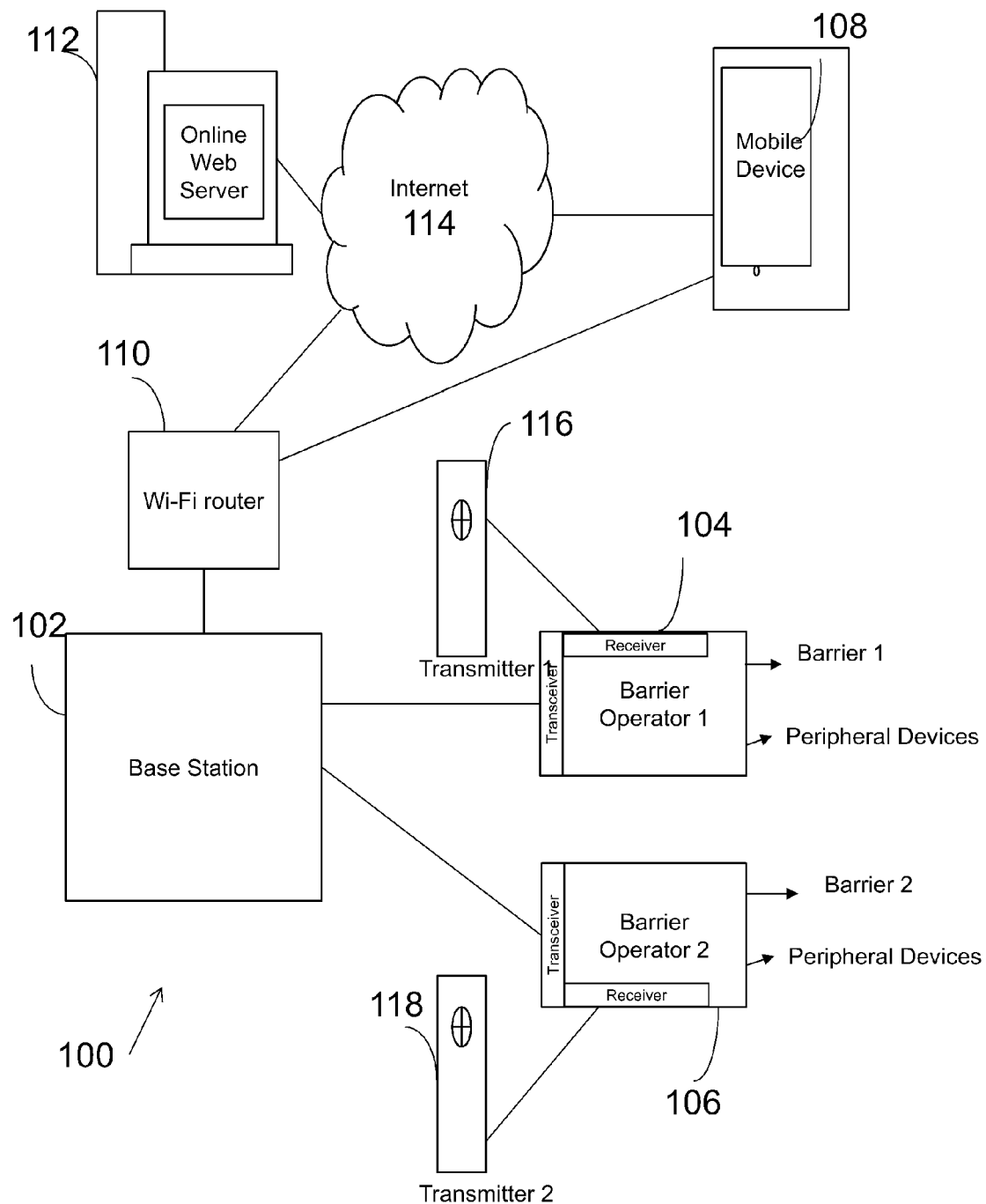
FIG. 1 is a schematic diagram of a remote control system for a barrier operator according to one embodiment of the invention.

The remote control system 100 as shown in FIG. 1 includes a gateway device 102 that connects barrier operators 104, 106 to a computer network. Gateway device 102 thus operates as a hub or base station for the barrier operators, via which all monitoring signals and control and command signals are routed. As described below, once connected to the network, barrier operators 104, 106 can be remotely monitored and controlled in a secure manner. Consistent with this secure connection methodology, gateway device 102 is configured to send control signals to barrier operators 104, 106 for controlling their operation and to receive monitoring data from the barrier operators 104, 106. Gateway device 102 is also used to set up and configure the barrier operators 104, 106.

Whilst the present example illustrates the control system 100 controlling two barrier operators 104, 106, it will be understood that the control system 100 can be configured to control any number of barrier operators in a similar manner.

Gateway device 102 is a networked device and includes a processor, memory, network interface and operating software stored on the memory (such as a Wi-Fi communications module for controlling the network interface and creating its own Wi-Fi network (i.e a functioning as a 'Wi-Fi hotspot') to allow access to the gateway device). A web server program is installed on gateway device 102.

In the illustrated embodiment, gateway device 102 is connected via the network interface to a home network. The home network also includes a Wi-Fi router 110 that is in turn connected to the Internet.

As described below, gateway device 102 can be accessed through a mobile device 108 with a suitable mobile application installed thereon (further described below) When the mobile device is connected to the home network, gateway device 102 can be accessed through the Wi-Fi router 110. Alternatively, gateway device 102 can be accessed over the Internet, by way of an online web server 112 when the mobile device 108 is not connected to the home network through the Wi-Fi router 110. Gateway device 102 is of course also accessible over the Internet by connecting to web server 112 via a conventional wired Internet connection.

Gateway device 102 includes a microcontroller and radio frequency transceiver to enable it to transmit control signals to, and receive monitoring and/or control signals from, barrier operators 104, 106. Barrier operators 104, 106 are also equipped with suitable transceivers for communicating with the gateway device 102.

In turn, each of the barrier operators 104, 106 controls the operation of respectively barrier 1 and barrier 2, for example by issuing commands for opening, closing or stopping the barrier 1 or barrier 2. Barrier operator 104 or 106 may also comprise devices such as lights, locks or position sensors, or be used to control such devices via communication with the barrier operator.

The system 100 can be set to 'vacation mode' by selectively disabling the transceiver in the barrier operators 104, 106.

The remote control system 100 further includes conventional transmitters 116, 118 for transmitting control signals to control a respective barrier operator 104, 106 via radio frequency communication through a receiver. Barrier operators 104, 106 also include a radio transceiver for communication with the gateway device 102.

Radio frequency communication between the gateway device 102 and barrier operators 106, 106 occurs over a wireless device network (WDN).

The Gateway Device

The gateway device 102 provides a hub or access point to the system. The gateway device has a unique gateway device identifier that is allocated to the gateway device at the point of manufacture or factory setup. Details of the gateway device identifier are also transmitted to the online web server 112 as part of the factory setup or manufacture process.

In addition to being accessible through mobile device 108, in one embodiment gateway device 102 also includes a touchscreen display provided by an integrated or connected tablet device for directly interfacing with a user. The gateway device 102 also includes a radio communications transceiver unit configured for radio frequency communication with the transceivers of the barrier operators 104, 106. The transceivers are configured for radio communication over a 915 MHz radio frequency band, which is a commonly used band in such applications, known to provide a range of up to approximately 50 m, and adapted to support rolling code communications.

As an alternative to conventional 915 MHz radio frequency communication, the gateway device 102 may be connectable to the barrier operators 104, 106 through other protocols, such as Wi-Fi, Bluetooth, wired Ethernet, RFID, NFC and USB.

Gateway device 102 includes a microcontroller in communication with the radio transceiver unit, the microcontroller including an integrated FLASH memory. The firmware for the operation of the gateway device is installed on the microcontroller.

During initial setup of the system 100, the barrier operators 104, 106 are registered with the gateway device 102. The gateway device can create a temporary Wi-Fi hotspot to allow an installer to access the gateway device using her own mobile device. The installer can be granted temporary and limited administrator privileges for the duration of the installation. The administrator privileges are revoked after the installation is complete.

The registration can be carried out in a number of ways. The barrier operator 104, 106 can be registered with the gateway device 102 by manually entering a unique ID such as a serial number of the transceiver associated with the barrier operator 104, 106 into the gateway device 102, either through the touchscreen, mobile application or online web server 112. Each barrier operator is assigned a unique 32 bit serial number during manufacture, which is used to address the barrier operator. Alternatively, the unique ID associated with the transceiver of each barrier operator 104, 106 can be automatically captured by the gateway device 104, 106, for example by using an infrared scanner, QR code or NFC scanner. Once the unique ID is captured by the gateway device 102, the respective operator 104, 106 may confirm registration by sending a confirmation signal to the gateway device 102. The confirmation signal may be sent after a push button on the transceiver of the respective operator 104, 106 is pushed, or a confirmation password is sent by the gateway device transceiver 102 to the transceiver of the barrier operator 104, 106 and validated.

Alternatively, the barrier operator can be registered with the gateway device by the gateway device first sending a password to the barrier operator along with the barrier operator's serial number. If the transmitted password matches the password for the barrier operator, the barrier operator sends a registration request for the barrier operator to the gateway device. The gateway device then registers the barrier operator. The use of the password is to ensure that an incorrect barrier operator is not registered with the gateway device, such an event being at risk of occurring when simultaneous registrations are being performed within radio range of each other.

Following a successful registration of barrier operator 104, 106 with gateway device 102, the barrier operator's operating characteristics and capabilities are transferred to the gateway device (ie. a profile containing that information is communicated thereto). Characteristics including model number, firmware version, and details of the barrier operator's capabilities (such as the commands it accepts and the classes of devices—eg. lights, electric locks and photoelectric beams—that can be connected) are thus provided to the gateway device 102. As described below, transferring this information to the gateway device allows it to effectively function as a 'virtual barrier operator'.

The transceiver unit of the gateway device 102 includes memory for storing rolling code counters, unique IDs of the transceivers of the barrier operators 102, 104 registered with the gateway device 102, a unique ID of the gateway device 102 itself, and one or more encryption keys.

During initial setup, the mobile device 108 is also registered with the system 100 by registering with the gateway device 102 and the online web server 112. Further detail regarding the registration process is discussed later with reference to FIG. 2.

Transmission of the barrier operator's characteristics and capabilities to the gateway device 102 allows configuration of the barrier operator's operating parameters via the touchscreen display (if provided) or mobile application. Operating parameters can be initially configured during setup, and also changed during maintenance and repair. By way of example, operating parameters include open and close travel limit positions for each barrier, timers for peripheral devices such as lights, part open position (e.g. prescribed barrier position for pet entry, pedestrian entry, parcel delivery, ventilation, etc).

Transmission of the barrier operator's characteristics and capabilities to the gateway device 102 also allows for the creation of an accurate and detailed display of the barrier operator on the user interface of the mobile application. Specifically, the user interface is populated with data that accurately encapsulates the actual functions of the barrier operator that is being monitored and controlled through the gateway device.

Moreover, the characteristic and capability data is a rich source of information for configuring the degree of remote operation and control that is to be permitted. For example, for barrier operators that include a photoelectric beam (details of which are transmitted to the gateway device as part of the characteristic and capability data) can be configured to allow for remote monitoring, but not for remote control.

The gateway device is also configured to provide a service menu for service technicians of the barrier operators 104, 106. The service menu allows the technician to log in to a service account when performing a service on the barrier operators 104, 106 such that each service is electronically logged in the gateway device 102. In addition, the gateway device is further configured to generate reminders for upcoming scheduled service dates for the barrier operators 104, 106.

The gateway device 102 is further configured to keep an event log of all control events executed by each barrier operator 104, 106 with the time and date of event execution. For example, a control event may be 'garage door closed by Bob at 10:45 am 3 Jul. 2014'. The event log can provide useful diagnostics information to a service technician during maintenance and/or repair. Moreover, the gateway device 102 is configured to send push notifications to the mobile device 108 so as to alert the user, for example, of the execution of an event, or a service reminder. The raw data received from the gateway device 102 is conveniently re-written into a more human-understandable form before being included in push notifications.

Gateway device 102 can be used to store and program sequences of actions or 'themes' (e.g. gate and garage opens at the same time; gate opens and driveway lighting turns on at the same time). Conveniently, the user of each registered mobile device 108 can store their own personal themes on the gateway device 102. The themes can be conveniently generated from the configuration and capability data that is delivered to the gateway device from the barrier operator.

Gateway device 102 can send push notifications to mobile devices 108, for example to notify the smart phone user when an event has occurred (e.g. 'garage door opened by Bob at 10:45 am 3 Jul. 2014').

The Mobile Device

The mobile application installed on the mobile device 108 generates a control interface based on the settings of the gateway device 102. In particular, the mobile application includes a control function associated with each barrier operator 104, 106. The mobile application generates an interface based on the barrier operators 104, 106 which are registered with the gateway device 102. For example, the mobile application includes a first control function and interface associated with barrier operator 104 (being a gate operator), and a second control function and interface associated with barrier operator 106 (being a garage door operator). Once the barrier operators 104, 106 are registered with the gateway device 102, and the mobile device 108 is also registered with the system 100, the control interfaces are generated based on the control functions for the registered barrier operators 104, 106.

Gateway device 102 can send push notifications to mobile device 108, for example to notify the mobile device user when an event has occurred (e.g. 'garage door opened by Bob at 10:45 am 3 Jul. 2014').

The wireless application interface is automatically populated based on the type and number of operators and peripheral devices that are controlled at each location and on the current access privileges for the gateway device 102.

The information stored on the gateway device 102 is used to control the content of the wireless application interface. For example, for embodiments where an animation of the barrier operator is displayed on the interface of the wireless application, any data that is required to drive the animation, is supplied from the gateway device 102. The supplied data can be processed through a timer that is built into the wireless application. However, the interface itself does not have knowledge of the control and monitoring functions behind the display. This removes the requirement of how to remotely control a device from the wireless application and frees the control from the logic of the application's interface.

Registering a Mobile Device

Figure 2:
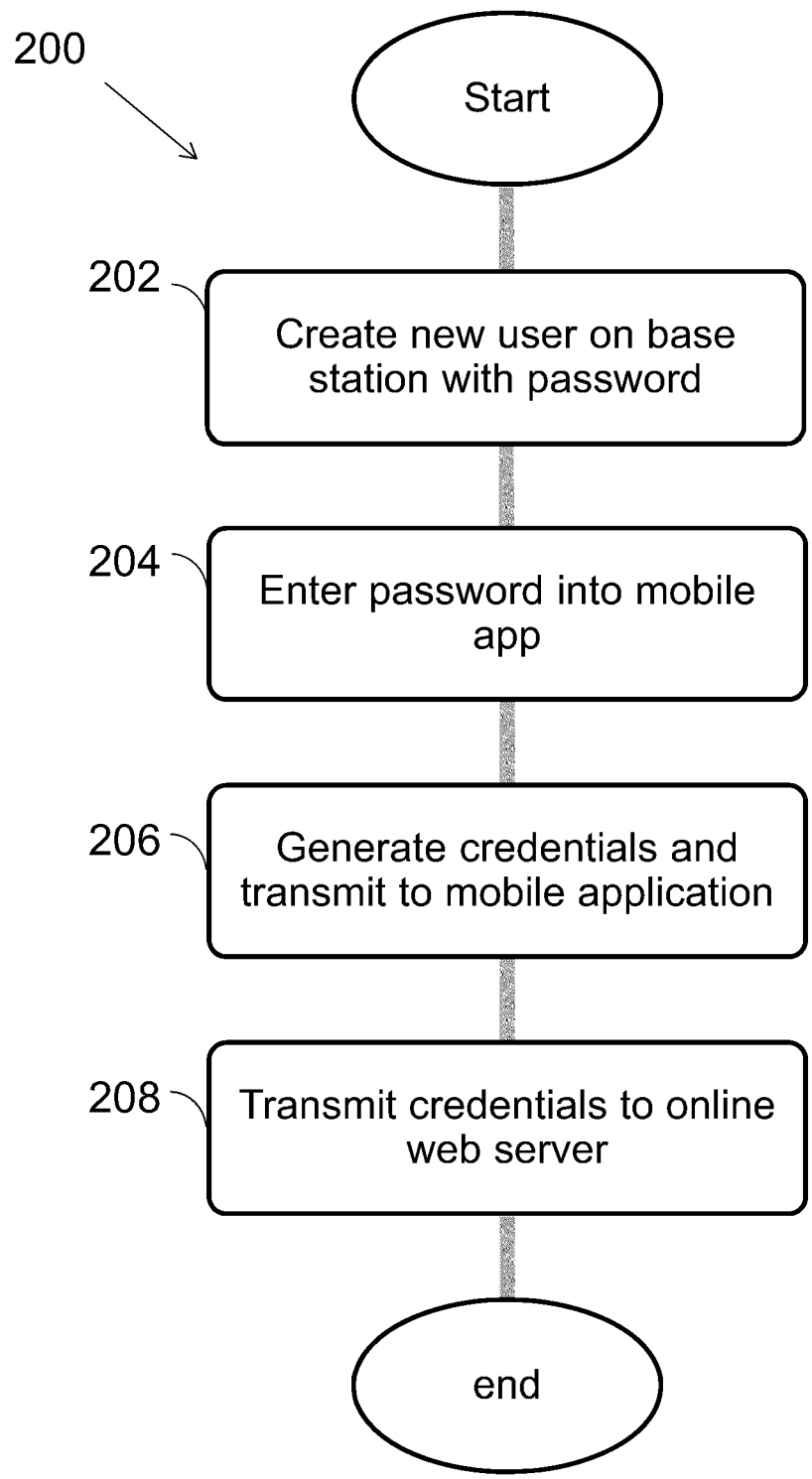
FIG. 2 is a flow diagram illustrating a method of registering a new mobile device user using the remote control system of FIG. 1.

A method 200 for registering a mobile device 108 with the system 100 will now be explained with reference to FIG. 2. Access to the system for the purpose of registering mobile devices is through the Wi-Fi network or alternatively remotely through the Internet 114.

At step 202, a new user account for the gateway device 102 is created with a password. The password is cryptographically hashed and saved on the gateway device 102. Once saved in this format, the gateway device 102 no longer has a copy of the plaintext password and the saved data cannot be used to recover the original text. However, the cryptographically hashed password still allows the gateway device 102 to verify whether a received password matches the original.

Once installed on the mobile device, the mobile application searches for gateway devices on the Wi-Fi network to which it can be registered. Then, at step 204, the user enters the same password into the mobile application on the mobile device 108. The password entered into the mobile application is then sent to the gateway device 102 over a secure HTTPS connection. Once the username and password are received by the gateway device 102, the plain text password is hashed and verified against the corresponding stored hash of password.

At step 206, the gateway device 102 generates a set of user credentials to identify the mobile device 108 and sends the credentials to the mobile application.

At step 208, the gateway device 102 applies a hashing function to the credentials and sends (synchs) the hashed credentials to the web server 112. Once the online web server 112 receives the relevant user credentials, the mobile device 108 is successfully registered and the user can login locally or remotely using the registered mobile device 108 to send control signals to the gateway device 102.

In one embodiment, once the mobile device 108 is registered, the password is used for logging onto the gateway device and/or web server.

A further method for registering a mobile device 108 with the system proceeds broadly as follows:
1. Create new user on base station 102 with password;
2. Generate mobile app credentials and one-time use code on base station 102;
3. Enter one-time use code and password into mobile app on device 108, and
4. Transmit credentials to mobile app.

More specifically, at step 1, a new user account for the gateway device 102 is created with a password. The password is cryptographically hashed and saved on the gateway device 102.

At step 2, the gateway device generates the credentials for the mobile application and a one-time use access code is generated. In one embodiment this one-time use access code is emailed to the user.

At step 3, the user enters the one-time use access code and password into the mobile app. These are transmitted to the gateway device and/or web server.

At step 4, the gateway device 102 and or web server 112 authorizes the one-time use access code and password. Once authorized, the credentials are transmitted to the mobile application and the mobile device 108 is successfully registered, and the user can login locally or remotely using the registered mobile device 108 to send control signals to the gateway device 102.

As with method 200, once the mobile device 108 is registered, the password is used for logging onto the gateway device and/or web server.

Remotely Controlling the Barrier Operator

Figure 3:
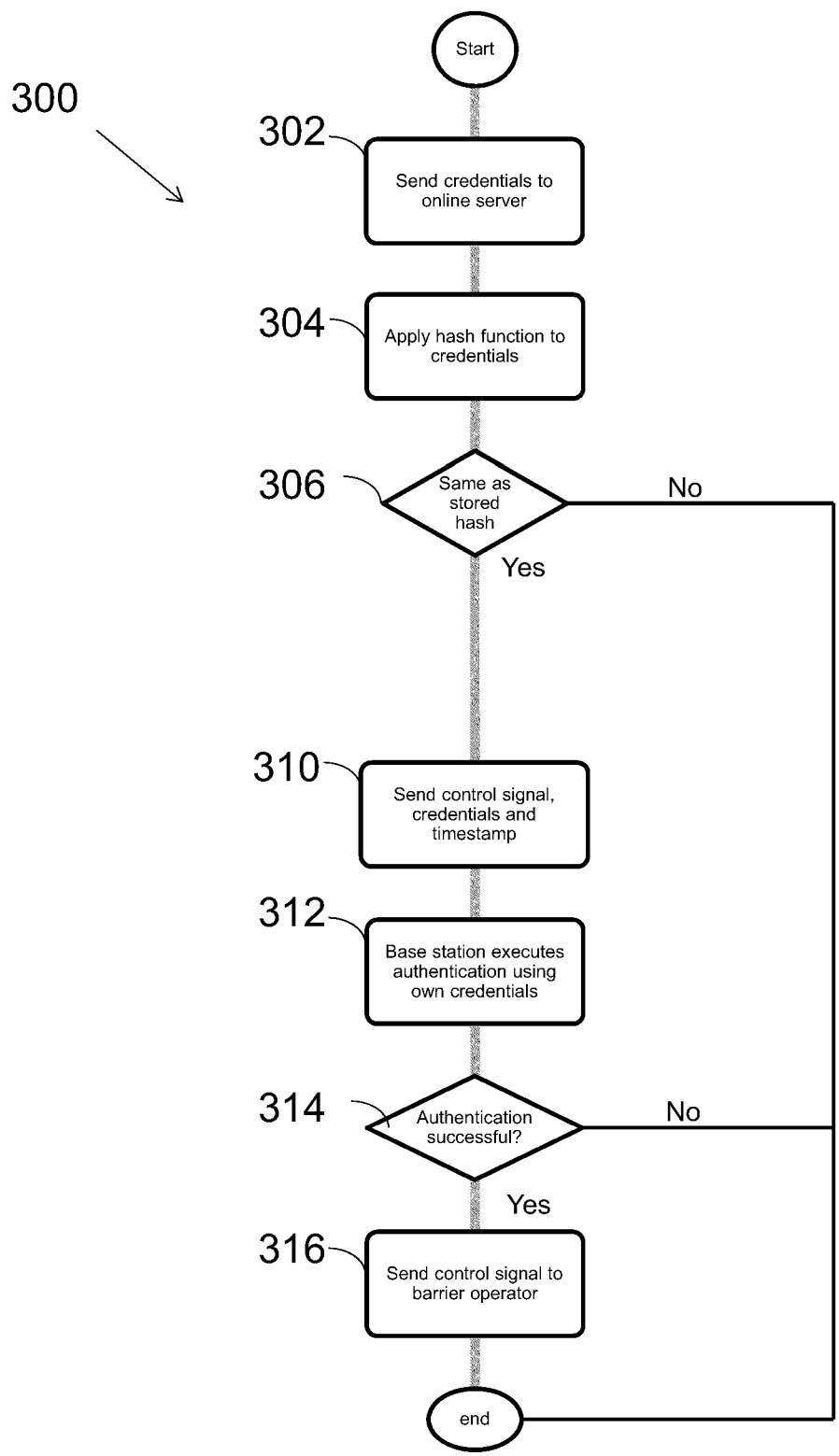
FIG. 3 is a flow diagram illustrating a method of controlling a barrier operator using a control signal transmitted from the mobile device after registration in accordance with the method of FIG. 2.

A method 300 of using a registered mobile device 108 to control a barrier operator using the system 100 will now be explained with reference to FIG. 3.

At step 302, once the user has entered his password into the mobile application in order to access the web server 112 or gateway device 102, the mobile application sends the credentials to the relevant entity (i.e server 112 or gateway device 102).

At step 304, a hashing function is applied to the credentials and the hashed value is compared with the corresponding stored hashed credentials for the mobile device 108.

At query step 306, if the hashed credentials match the stored hashed credentials, the user is verified and the method 300 proceeds to step 310. If the hashed credentials do not match the stored hashed credentials, the user is not verified and the method 300 ends.

At step 310, the user uses the mobile application to send a control signal (e.g. open barrier 1) to the gateway device 102. The mobile application sends the control signal, along with selected credentials and a timestamp (e.g. in UTC). As the request is timestamped, valid requests cannot be replayed over time, and there is an ability to reject commands if they are not in a valid timeframe.

The web server 112 does not check the authenticity of the control signal and does not generate a valid control signal independently of a registered device. This ensures that if the web server's security is compromised, the gateway device 102 can still verify that the message originated from a registered mobile device 108.

At step 312, once the data is received by the gateway device 102, the gateway device 102 performs its own authentication of the credentials. If the authentication is unsuccessful, the method 300 process ends.

At step 316, the gateway device 102 sends the control signal to the barrier operator 104 to open barrier 1.

In the system 100, the password of the mobile device user is not saved on the online web server 112. Accordingly, the password cannot be obtained by an unauthorised third party via the online web server 112 to access the gateway device 102 and control the barrier operators 104, 106.

Moreover, only a registered mobile device 108 can gain access to the online web server 112 and gateway device 102. In the event that an unauthorised third party obtains the password, the unauthorised third party would not be able to access the system 100 using an unregistered mobile device that has the mobile application installed.

Whilst the system 100 illustrates an embodiment in which only one mobile device 108 is shown, it will be understood that the system 100 is configured to permit registration of multiple mobile devices. Each mobile device can be registered using the method 200 as previously described, and each mobile device will transmit control signals to the gateway device 102 in the manner described in method 300.

Different mobile devices registered with the gateway device 102 can be configured using the gateway device 102 to have different access privileges. For example, one mobile device may only have access privileges to transmit control signals to barrier operator 104, and one mobile device may only have access privileges to transmit control signals to barrier operator 106. This feature can be useful in large industrial facilities in which many barrier operators and mobile devices registered can be registered with a gateway device, not all personnel will have full access to the facility, and this corresponding mobile devices for each personnel can be set up with different access privileges.

Communication Protocols

The gateway device 102 communicates with the barrier operators 104, 106 using multiple channel radio communication in the 915 MHz band. Before transmitting a control signal to a barrier operator 104, 106, the transceiver of the barrier operator 104, 106 selects a channel at random, listens for activity on the channel, and determines whether to wait until the channel is clear or select a different channel for transmitting the control signal. Once the control signal is sent, the transceiver listens for an acknowledgment from barrier operator 104, 106 transceiver on the same channel. If no acknowledgement is received, the gateway device 102 transceiver selects a randomised time to re-transmit the control signal and listens for acknowledgement. If all transmissions fail, the gateway device 102 transceiver generates an error message notifying the gateway device 102 that the control signal could not be sent.

If the barrier operator 104, 106 receives the same control signal more than once because an acknowledgement was not received by the gateway device 102 transceiver for a previous transmission attempt, the barrier operator 104, 106 continues to acknowledge the repeated control signals but does not execute the control signal a second time.

Each transmitted control signal uses a new rolling code counter value. The system 100 uses encryption with rolling code counters of suitable bit-depth for communication with the barrier operators 104, 106.

Transmission of data from the barrier operators 104, 106 to the gateway device 102, and communication between a transmitter 116, 118 with a respective barrier operator 104, 106 are also carried out in the same manner. In particular, each transceiver (e.g. this can be transceiver of the barrier operator 104, 106, gateway device 102 or transmitters 116, 118) maintains a rolling code counter for both incoming and outgoing packets for each transceiver it is registered with.

Each transceiver has a unique identifier, and when two transceivers are registered to one another, the unique identifier of each transceiver is known to the other transceiver. In this manner, the transceiver will only process a command received from another transceiver with which it is registered.

The tablet device associated with gateway device 102 includes a USB port, suitable drivers and application software and communicates with a USB host provided in gateway device 102. Communication between the tablet device (if one is used) and the gateway device may alternatively be by way of any suitable protocol. When USB is used, the USB application software manages the initial USB connection as well as being responsible for USB packet formatting and processing.

In the illustrated embodiment, the gateway device transceiver forms the centre hub of a star network of WDN devices. The gateway device transceiver routes commands received from the tablet device either to its own internal command processor, or translates the commands for transmission to a barrier operator 104, 106 via the WDN. The gateway device transceiver also receives wireless device network packets from controlled and/or monitored devices 104, 106 and routes them either to its internal command processor or translates them for transmission elsewhere.

Another convenient function enabled by the virtual barrier operator is the ability for a physical barrier operator to receive a command from a transmitter 116, 118 and pass the command on the gateway device 102 for actioning (with or without performing an action on the barrier operator). For example, the transmitter can be programmed (through the gateway device 102) to perform an action (for example to turn on a light or unlock a door) on any other device that is communication with the gateway device 102. The gateway device 102 can also be configured to forward a push notification or email to the mobile device when it receives such a transmission from the transmitter 116, 118.

Figure 4A:
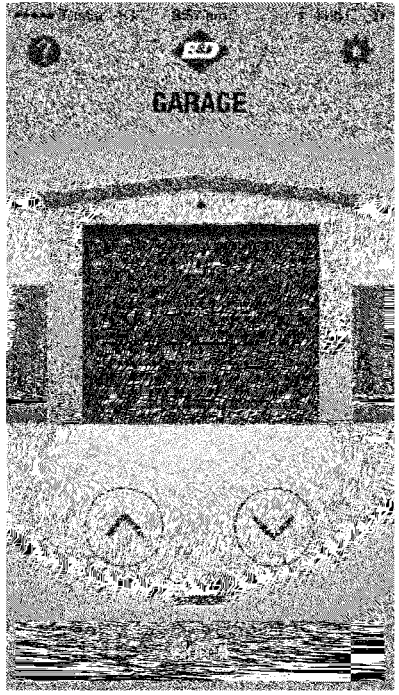
FIGS. 4A to 4H are illustrations of a wireless application interface on a mobile device that is suitable for use with the remote control system of the present invention.
Figure 4B:
Figure 4C:
Figure 4D:

An example user interface for a wireless application that is installed on mobile device 108 is illustrated in FIGS. 4A to 4H. More particularly, FIGS. 4A and 4C illustrate the interface display of a garage door connected to barrier operator 106 respectively in a closed and open position. From the closed position, the user of mobile device 108 can issue a control signal to the barrier operator 106, by pressing the 'up arrow' button shown In FIG. 4A. In the case of a remote connection, this action causes the command signal to be transmitted from mobile device 108 through the Internet 114 to web server 112. As described above, command signals received at web server 112 are relayed (again through the Internet 114) to the gateway device 102 for authentication and actioning. Once received and authenticated at gateway device 102, the command is transmitted to barrier operator 106 via the WDN network. Barrier operator 108 executes the command (in this case to open the garage door) upon receipt.

Immediately after the 'close door' command is executed by barrier operator 106, a monitoring signal is sent from barrier operator to gateway device 102 to indicate that the command has been executed. Gateway device 102 then sends basic status information (as opposed to real time data as to the position of the garage door) regarding the activated command to mobile device 108 to drive an animation displayed in the wireless application's user interface. In the case of a 'close door' command, the status information is: starting position, direction and speed of the garage door. This information is sufficient to generate the animation illustrated in FIG. 4D, which shows the garage door moving from a closed to an open position in approximately the same timeframe as the closing of the garage door being controlled.

Different items of status information are appropriately transmitted to the mobile device 108 depending on the command that is activated. The algorithm that executes on the mobile device 108 to display the animation (using the status information as input) can be specifically tailored to each barrier operator 106, using the operator's specific configuration data that is supplied to the gateway device 102.

The user interface can also communicate detailed information about the circumstances in which a command was executed on the barrier operator. For example, the interface can indicate whether a close command was executed in response to an auto-close setting, or in response to a command received through the web server, home network, gateway device, transmitter or directly through the barrier operator.

An equivalent process and data flow is used to generate the animation of the garage door moving from an open to a closed position, as illustrated in FIG. 4B.

Figure 4E:
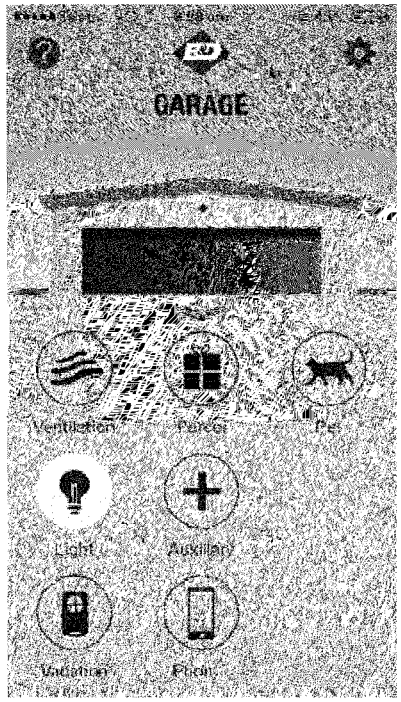

FIG. 4E illustrates the interface display of the various functions described above available from the wireless application, namely: ventilation, parcel, pet, light, auxiliary, vacation and phone.

Figure 4F:
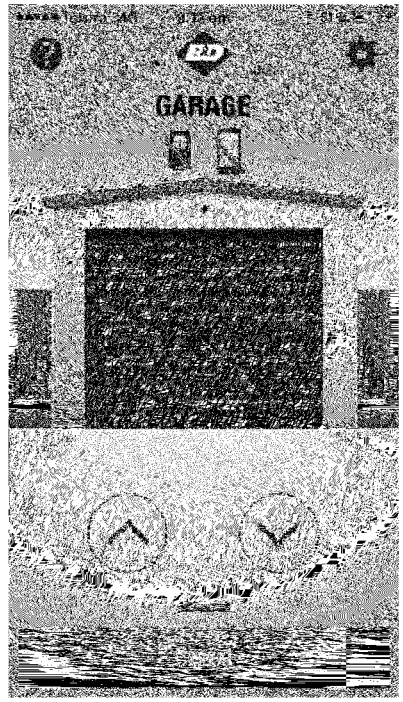
Figure 4G:
Figure 4H:

FIG. 4G illustrates the log-in screen that requires the entry of a password to access the online web server and/or gateway device 102. FIG. 4F illustrates the interface display of the remote control system in which access from mobile device 108 and transmitter 116 has been disabled, whereas FIG. 4H shows an interface display indicating a low-battery status for a connected lock.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristic described herein may be combined in any suitable manner in one or more combinations.

The word 'comprising' and forms of the word 'comprising' as used in this description do not limit the invention claimed to exclude any variants or additions.

Modifications and improvements to the invention will be readily apparent to those skilled in the art. Such modifications and improvements are intended to be within the scope of this invention.

The invention claimed is:

1. A gateway device for remote monitoring and control of a barrier operator, the device including:
   a processor;
   a data storage device;
   a network interface for connecting the gateway device to a computer network;
   an operator interface for communicating with the barrier operator; and
   a computer program, which when executed on the processor:
   permits remote access to the gateway device over the computer network;
   transmits control signals received over the computer network to the barrier operator via the operator interface;
   receives monitoring signals from the barrier operator via the operator interface;
   communicates the received monitoring signals over the computer network; and
   executes a security algorithm requiring a client device to register with the gateway device prior to the client device being permitted to remotely access the gateway device over the computer network.

2. A gateway device according to claim 1, wherein the computer program is operable to authenticate the control signals before transmitting to the barrier operator.

3. A gateway device according to claim 2, wherein the control signals include a time stamp and the computer program is operable to reject control signals that are received outside of a permitted timeframe.

4. A gateway device according to claim 1, wherein registration of the client device is effected by storage on the gateway device of a unique client device identifier.

5. A gateway device according to claim 4, wherein the client device identifier is also stored on a remote Internet server in association with a unique gateway device identifier.

6. A gateway device according to claim 1, wherein the security algorithm is operable to transmit authentication credentials to the client device during registration of the client device, the authentication credentials being stored on the gateway device and client device and being suitable for use by the client device to access the gateway device.

7. A gateway device according to claim 6, wherein the control signals received over the computer network from the client device include the authentication credentials, the computer program being operable to authenticate the control signals using the authentication credentials.

8. A gateway device according to claim 6, wherein registration of the client device is effected by storage on the gateway device of a unique client device identifier that is also stored on a remote Internet server in association with a unique gateway device identifier, and wherein
   the authentication credentials are transmitted to the client device along with the unique client device identifier and the unique gateway device identifier.

9. A gateway device according to claim 5, wherein at least a subset of the authentication credentials are transmitted to the Internet server from the gateway device after the client device is registered with the gateway device.

10. A gateway device according to claim 1, wherein the computer program includes a module operable to receive and store data from the barrier operator pertaining to the barrier operator's operating characteristics.

11. A gateway device according to claim 1, wherein the gateway device is communicable with a remote Internet server that is operable to mirror the state of the barrier operator.

12. A gateway device according to claim 1, wherein the operator interface provides for wireless communication with the barrier operator via radio communication.

13. A gateway device according to claim 12, wherein the operator interface includes a wireless transceiver unit including memory storing one or more of: rolling code counters, one or more unique IDs of transceivers of one or more barrier operators registered with the gateway device, a unique ID of the gateway device, and one or more encryption keys.

14. A gateway device according to claim 1, wherein the computer program is configured to store an event log of monitoring signals detailing control events executed by the barrier operator.

15. A gateway device according to claim 14, wherein the gateway device is operable to send notifications to the client device based on the event log.

16. A gateway device according to claim 1, wherein the gateway device is operable to receive a command emanating from a local wireless control device and relayed by way of the barrier operator.

17. A remote monitoring and control system, comprising: the gateway device according to claim 1; and one or more barrier operators in communication with the gateway device.

18. A remote monitoring and control system according to claim 17, further including a mobile application installable on a client device, the mobile application being operable to generate a control interface based on settings of the gateway device.

19. A remote monitoring and control system according to claim 17, further including a server device communicatively coupled to the gateway device through the Internet, the server device being operable to allow client devices to securely access the gateway device.

20. A method for remotely monitoring and controlling one or more barrier operators, the method comprising the steps of:

providing a gateway device according to claim 1; and accepting registration of the barrier operator with the gateway device.

* * * * *